March 8, 1966 B. HIKES ETAL 3,239,067
COMBINED CLARIFIER AND DIGESTER OF HIGH CAPACITY
Filed March 15, 1963 3 Sheets-Sheet 1

INVENTORS.
Burd Hikes,
BY Peter Grujanac,
Byron Hume Groen & Clement
ATTYS.

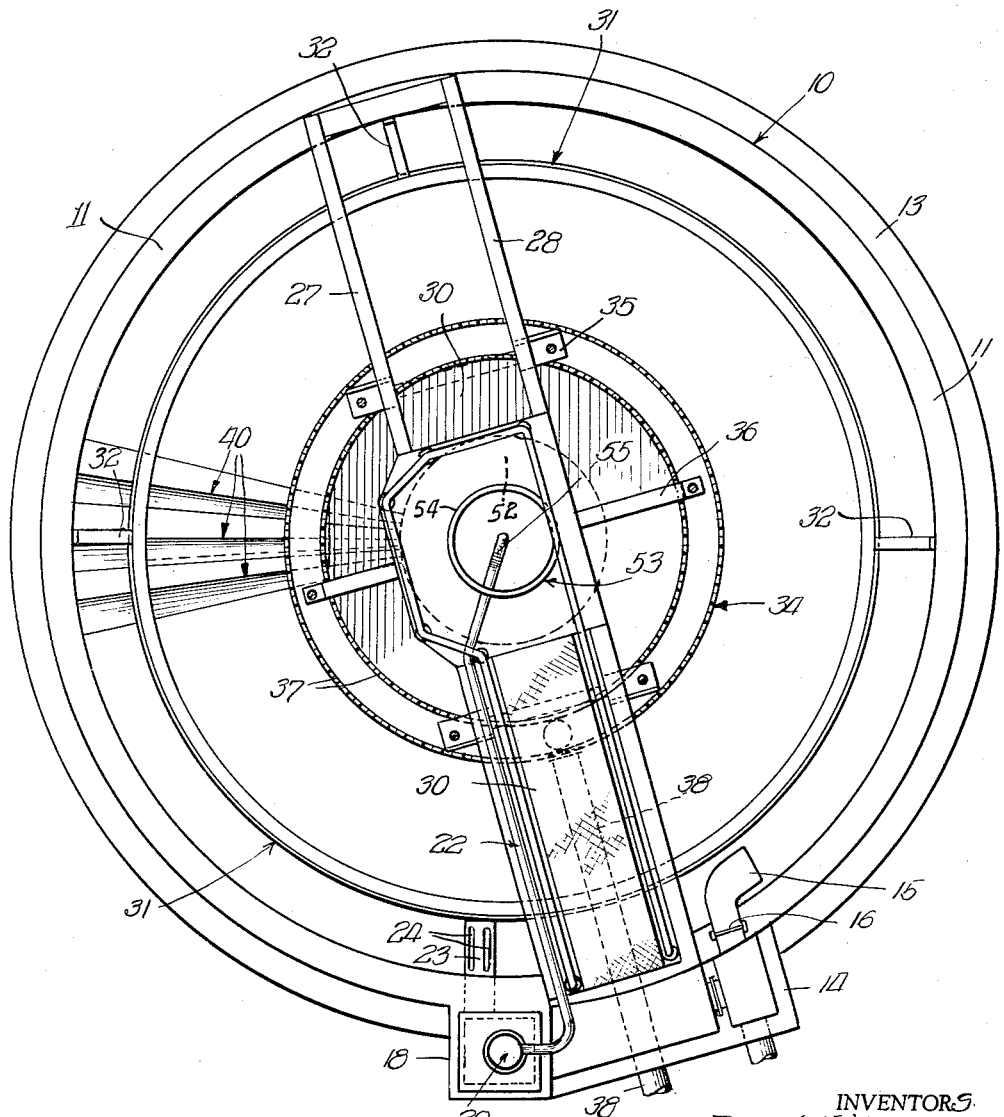

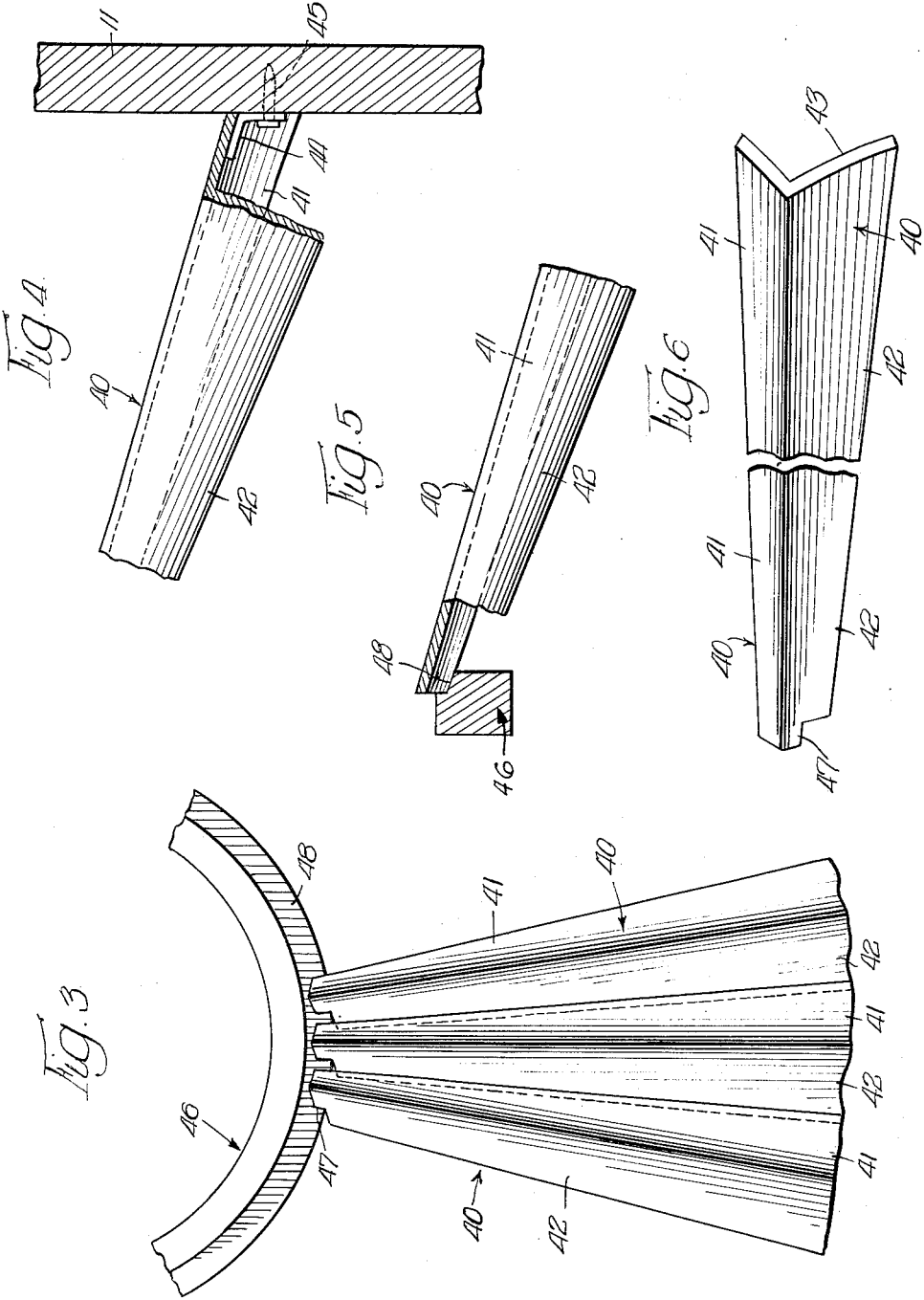

United States Patent Office 3,239,067
Patented Mar. 8, 1966

3,239,067
COMBINED CLARIFIER AND DIGESTER OF HIGH CAPACITY
Burd Hikes, Wilmette, and Peter Grujanac, Chicago, Ill., assignors to Lakeside Engineering Corporation, Chicago, Ill., a corporation of Illinois
Filed Mar. 15, 1963, Ser. No. 265,398
3 Claims. (Cl. 210—521)

The invention relates to the disposal of sewage and industrial wastes and has reference in particular to a combination clarifying and digestion tank having a baffle arrangement located between the digestion compartment and the clarifying compartment.

The primary object of the invention is to provide a combination clarifying and digestion tank having improved skimming, settling and clarifying operations all combined with the conventional functions of a digester and wherein the said operations are performed more efficiently by reason of the baffle arrangement.

Another object of the invention is to provide a combination clarifying and digestion tank wherein the individual baffle elements of the baffle arrangement have a special shape in transverse section, and wherein said baffle elements are spaced from each other to permit free flow of liquid through the baffle arrangement in both a downward and an upward direction.

A ceiling for the digestion compartment is provided by the baffle arrangement which is disposed in concentric relation surrounding the open end of a vertical stack, and said stack extending through and beyond the clarifying compartment. The baffle elements permit the incoming liquid to flow downwardly into the digestion compartment close to the walls of the tank and the said baffles also direct the gases and scum upwardly and centrally into the bottom end of the stack.

Another object of the invention is to provide a combination tank as described which will be capable of high capacity operation, which will be relatively economical to build and wherein use can be made of the full tank volume for either settling or digestion capacity.

Another object is to provide a combination tank as described wherein thorough seeding of the upper portion of the digestion compartment is maintained by circulating liquid drawn off from the tank. The liquid so drawn off is pumped into the top projecting end of the stack and the same is thus returned to the digestion compartment. The said compartment is thus properly seeded, any scum which may be floating on the surface within the digestion compartment is broken up and foaming is substantially reduced if not eliminated.

With these and various other objects in view the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 2 is a top plan view of the combination tank shown in FIGURE 1.

FIGURE 3 is a plan view on an enlarged scale taken substantially on line 3—3 of FIGURE 1 and showing details of the baffle arrangement.

FIGURE 4 is an elevational view, with parts in section, showing the supports for the tank end of the baffles.

FIGURE 5 is an elevational view, with parts in section, showing the support for the stack end of the baffles; and FIGURE 6 is a top plan view of a baffle such as may be employed for the baffle arrangement of the invention.

Figure 1:
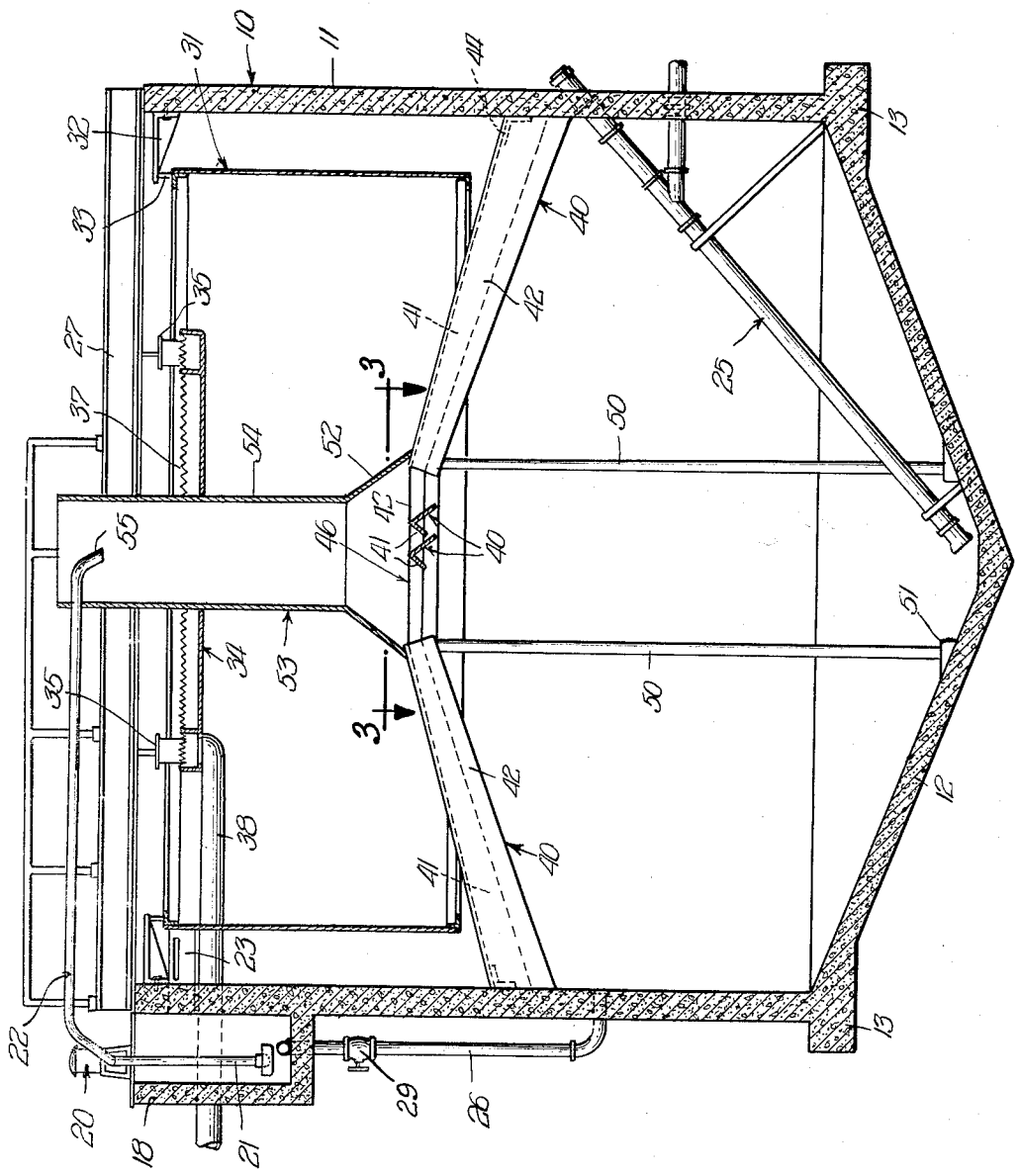
FIGURE 1 is a vertical, sectional view of a combination clarifying and digestion tank incorporating the improved baffle arrangement of the present invention.

The embodiment selected for illustrating the invention consists of the tank 10 which is formed of concrete having the vertical cylindrical wall 11, a conical bottom 12 and base supporting portions 13. The incoming liquid to be treated is delivered to the influent well 14 also formed of concrete and preferably integral with the cylindrical wall 11 and located exteriorly adjacent the top of the tank. The raw liquid such as sewage and the like is delivered to an influent deflector 15 which extends through the wall 11 and connects the well 14 with the peripheral race within the tank. A gate 16 is located in the deflector 15 for controlling flow of the incoming liquid. The deflector 15 is curved so as to deliver the liquid in a tangential manner to cause the liquid to flow around the peripheral race in a manner to be presently described.

The well 18 also constitutes part of the present tank, the same comprising the scum well and which is of concrete being located exteriorly of the wall 10 and adjacent the top of the tank. The scum well 18 supports the motor driven pump 20 having the inlet or suction pipe 21 which depends into the well and terminates near the bottom thereof. The outlet pipe 22 leads from the pump 20 and is disposed on top of the tank to extend towards the center thereof. The scum and liquid from the peripheral race is discharged into the well 18 by the scum outlet pipe 23 which passes through the tank wall 11 and extends into the peripheral race as shown in FIGURES 1 and 2. The pipe 23 is formed with longitudinal openings or slits 24 through which the scum and liquid enter the outlet pipe and said openings thus determine the level of the liquid within the tank.

The circular wall 11 and the bottom wall 12 suitably support the drain pipe 25 through which the settled sludge and solids are removed from within the tank. A recirculation pipe 26 leads from the lower section, that is from the digestion compartment of the tank, to the scum well 18. The pipe 26 is preferably provided with a valve 29 by means of which the pipe can be closed. When said valve is opened it will be understood that the liquid from the tank is automatically supplied to the scum well 18 and the liquid within the well will reach a level substantially equal to that within the tank. However, when the pump 20 is operating, liquid will be withdrawn from the scum well thereby maintaining a somewhat lower level in the well. This liquid so withdrawn from the scum well is delivered by the outlet pipe 22 to the stack opening for return to the digestion compartment all of which will be understood as the description proceeds.

The circular wall 10 supports the superstructure which may include the diametrically extending beams 27 and 28 which provide a walk such as 30 across the top of the tank for the convenience of the attendant. Said beams may also assist in supporting the depending circular skirt 31 which, however, is primarily supported by the angle members 32 fixed to the circular wall 11 on the inside of the tank. The circular skirt 31 is suitably secured to the members 32 by the threaded rods 33. In the embodiment disclosed the skirt 31 is substantially concentric with the cylindrical wall 11 of the tank although the same could be supported eccentrically to form an annular race progressively decreasing in width from the influent deflector 15 to the scum outlet 23. However, as disclosed the skirt 31 forms an annular race of uniform width around the tank and it will be noted that the skirt terminates near the vertical center of the tank. The skirt accordingly divides the upper portion of the tank into a central clarifying compartment which is located within the skirt and a peripheral race which is located between the skirt and the circular tank wall. The compartment and race are joined by a connecting passage below the skirt.

The launder 34 is located within the clarifying compartment and said launder decants the clear and clarified liquid from the tank. Said launder consists of a circular trough having supporting members such as 35 and 36 by means of which the launder is suspended from the beams 27 and 28. By adjustment of the supporting rods 35 the elevation of the launder can be varied and the same can be horizontally positioned as desired for the best operation. The top edges of the launder on both sides are notched at 37 to provide weirs over which the clarified liquid will flow into the trough. The said liquid is eventually delivered to the effluent pipe 38 which connects with the launder at one end and passes through the wall 11 of the tank for connection at its opposite end to a convenient discharge.

The peripheral race initially receives the liquid delivered to the tank and the same is delivered thereto in a tangential direction to cause movement of the liquid around the race and spiralling movement of the liquid in a direction downwardly towards the bottom of the skirt. The rotation of the liquid in the race imparts rotation to the entire liquid contents of the clarifying compartment. Accordingly, the solids, expect the floating materials such as scum and grease travel downwardly to the bottom of the skirt. The heavy solids continue on their downward direction and eventually pass into the digestion compartment comprising the lower half of the tank. The lighter solids will pass underneath the circular skirt into the clarifying compartment and here the lighter solids settle out since the velocity is relatively slow and travel is in an upward direction. The clarified liquid is removed by the launder 34 whereas the scum with some liquid can be removed from the peripheral race by the outlet pipe 23.

In accordance with the invention a baffle arrangement is located approximately centrally of the tank and thus the baffle arrangement separates the peripheral race and the clarifying compartment from the digestion compartment. The arrangement is formed by a plurality of baffles 40, FIGURE 6 and which are preferably V-shaped in transverse section having a short leg 41 and a longer leg 42. The baffles are also triangular when viewed in plan elevation having a greater width at their tank end than at their stack end. Also each baffle 41 is cut on an angle as indicated by numeral 43 and best shown in FIGURE 6 so that the baffles when in place are disposed at an angle with the stack end at a higher elevation than their tank end. Also, by reason of the angular cut 43 the said end has a close fit with the circular wall 11 of the tank, and said end of each baffle is suitably supported from the wall by the bracket 44 and securing screw 45. The stack end of each baffle is supported by a ring such as 46 located centrally of the tank and at the desired elevation for supporting the baffles so that they slope downwardly from their center end to the tank wall. To assist in supporting each baffle from the center ring 46 the long wall 42 of the same is cut away as at 47 and the ring is notched at 48. The ring 46 is suitably supported within the tank by means of the supporting rods 50. The number of rods employed is a matter of design and depends largely on the size of the tank and the weight of the ring 46. However, in all cases the rods will extend completely around the ring in spaced relation and each rod at its base end is suitably supported from the bottom wall 12 of the tank by means of a platform such as 51.

It will be observed that the baffles 40 are located in radially extending relation around the tank from the center ring 46 to the circular wall 11 and that the baffles provide a longitudinal opening between each other which is the result of the short leg and long leg construction of each baffle. By reason of the longitudinal openings in the baffle arrangement as best illustrated in FIGURE 1, it will be appreciated that the liquid and solids from the peripheral race can flow downwardly through the baffle arrangement into the digestion compartment and that the liquid from said compartment can also flow in an upward direction in the clarifying compartment. An additional feature of the baffle arrangement resides in the fact that the scum and gases will be directed by the upward sloping position of the baffles towards the center of the tank and into the open flaring end 52 of the stack generally designated by the numeral 53. The cylindrical portion 54 of the stack 53 extends upwardly through the clarifying compartment to project beyond the beams 27 and 28. Accordingly, the gases from the digestion compartment are vented to the atmosphere through the stack and the scum and other floating wastes will collect within the cylindrical portion 53 of the stack.

The outlet pipe 22 from the motor driven pump 20 extends horizontally above the beams 27 and 28 and said pipe enters the cylindrical portion 54 of the stack opening to terminate in a downward bend 55 within the said stack. Accordingly, the liquid from the scum well 18 is withdrawn by the motor driven pump and said liquid is delivered by pipe 22 to be eventually discharged into the stack opening. This recirculated liquid which is thus delivered to the digestion compartment maintains thorough seeding of the said compartment. Also, said liquid aids in breaking up any floating scum and also minimizes, if not, eliminates foaming which often causes serious trouble in conventional digesters.

The baffle arrangement divides the tank horizontally and approximately centrally of its vertical height to thus separate the clarifying compartment and the peripheral race from the digestion compartment. By reason of said baffle arrangement in combination with the stack the present tank is capable of improved operation. The stack is cylindrical for the greater part of its vertical height having an open bottom end on approximately a fifty-four degree angle. The baffles are shaped in transverse section so as to promote the trapping of the gases and scum and the directing of the same to the stack opening. Also, the long and short legs of the baffle elements provide for the longitudinal openings between the elements and thus flow of the liquid is able to take place in both a downward and an upward direction. The construction is entirely practical for tanks having diameters greater than thirty-six feet and as regards such tanks and also smaller tanks the depth is reduced and substantial savings in construction costs are obtained.

The invention is not to be limited to or by details of construction of the particular embodiment thereof illustrated by the drawings, as various other forms of the device will, of course, be apparent to those skilled in the art without departing from the spirit of the invention or the scope of the claims.

We claim:

1. In a combination clarifying and digestion tank, a substantially circular tank having a vertical cylindrical wall and a bottom wall, an annular skirt depending within the tank in spaced relation to the cylindrical wall thereof, said skirt dividing the upper portion of the tank into a centrally disposed clarifying compartment within the skirt and a peripheral race extending around the skirt and between the skirt and the cylindrical wall of the tank, an inlet conduit supplying incoming liquid to the peripheral race, a launder positioned within the clarifying compartment for decanting clear liquid, means for discharging the clear liquid from the launder, a stack conduit located concentrically within the depending skirt, said stack conduit being open at each end and having a cylindrical part extending upwardly through the clarifying chamber to project beyond the said chamber, a baffle arrangement located within the tank below the stack conduit and said baffle arrangement being inclined upwardly from the cylindrical wall of the tank to the stack conduit so as to separate the clarifying compartment and the peripheral race in the upper portion of the tank from a digestion compartment comprising the bottom portion of the tank, said baffle arrangement providing openings to permit flow of liquid in a downward and also in an upward direction, said baffle arrangement comprising a plurality of baffle elements disposed circumferentially around and communicating with the open bottom end of the stack conduit, said baffle elements extending radially from the periphery of the open bottom end of the stack conduit to the cylindrical wall of the tank, and the said baffle elements being constructed and arranged along the entire cross sections thereof for trapping gases from the digestion compartment and for conveying the gases to the communicating stack conduit.

2. In a combination clarifying and digestion tank as defined by claim 1, additionally including a supporting ring at the lower end of the stack conduit for supporting the baffle elements at their ends adjacent the stack conduit, said baffle elements terminating at the supporting ring and said ring being approximately concentric and in vertical alignment with the open bottom end of the stack conduit.

3. In a combination clarifying and digestion tank as defined by claim 1, additionally including a supporting ring at the lower end of the stack conduit for supporting the baffle elements at their ends adjacent the stack conduit, said baffle elements having a shape approximately an inverted V, and said elements being so inclined that their ends adjacent the stack member are higher in elevation than their ends adjacent the cylindrical wall of the tank.

References Cited by the Examiner

UNITED STATES PATENTS

| | | | |
|---|---|---|---|
| 2,425,371 | 8/1947 | Green | 210—46 |
| 2,580,761 | 1/1952 | Green | 210—46 |
| 2,717,873 | 9/1955 | Montgomery et al. | 210—197 |

FOREIGN PATENTS

| | | |
|---|---|---|
| 300,294 | 9/1917 | Germany. |
| 630,505 | 10/1949 | Great Britain. |

REUBEN FRIEDMAN, *Primary Examiner.*